United States Patent
Wang et al.

(10) Patent No.: US 10,993,106 B2
(45) Date of Patent: Apr. 27, 2021

(54) METHOD AND APPARATUS FOR ACCESS, HANDOVER, AND ENCRYPTION CONTROL OF A UE

(71) Applicant: Samsung Electronics Co., Ltd., Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd.

( * ) Notice: Subject to any disclaimer, the term of this patent is extended or adjusted under 35 U.S.C. 154(b) by 46 days.

(21) Appl. No.: 16/587,928

(22) Filed: Sep. 30, 2019

(65) Prior Publication Data

US 2020/0029204 A1    Jan. 23, 2020

Related U.S. Application Data

(63) Continuation of application No. 15/753,863, filed as application No. PCT/KR2016/009243 on Aug. 22, 2016, now abandoned.

(30) Foreign Application Priority Data

Aug. 20, 2015   (CN) .......................... 201510514353.8

(51) Int. Cl.
   *H04W 8/26*     (2009.01)
   *H04W 76/20*    (2018.01)
   (Continued)

(52) U.S. Cl.
   CPC .............. *H04W 8/26* (2013.01); *H04W 24/10* (2013.01); *H04W 74/002* (2013.01);
   (Continued)

(58) Field of Classification Search
   CPC ........... H04W 74/002; H04W 74/0833; H04W 74/0858; H04W 76/11; H04W 76/12;
   (Continued)

(56) References Cited

U.S. PATENT DOCUMENTS 8,934,354 B2    1/2015 Jeong
2010/0002582 A1*  1/2010 Luft ................. H04W 74/0866
                                                370/230.1
(Continued)

FOREIGN PATENT DOCUMENTS

CN       101803234       8/2010
CN       102047601       5/2011
(Continued)

OTHER PUBLICATIONS

Chinese Office Action dated Jul. 31, 2020 issued in counterpart application No. 201510514353.8, 14 pages.

(Continued)

*Primary Examiner* — Gary Mui
(74) *Attorney, Agent, or Firm* — The Farrell Law Firm, P.C.

(57) ABSTRACT

Disclosed is a method for access of a user equipment (UE) in a communication system, which includes the UE, a base station, and a network node. The base station carries out radio link control (RLC) layer and media access control (MAC) layer functions. The network node carries out packet data convergence protocol (PDCP) layer, radio resource control (RRC) layer, and non-access (NAS) layer functions. The method includes the network node receiving a non-access stratum identifier of the UE or a random number generated by the UE sent from the UE through a RRC message, and the network node sending the received non-access stratum identifier or the random number to the base station, for the base station to set a UE collision dismiss identifier.

16 Claims, 9 Drawing Sheets

(51) Int. Cl.
*H04W 76/12* (2018.01)
*H04W 74/00* (2009.01)
*H04W 74/08* (2009.01)
*H04W 76/22* (2018.01)
*H04W 76/11* (2018.01)
*H04W 76/27* (2018.01)
*H04W 24/10* (2009.01)
*H04W 80/02* (2009.01)
*H04W 80/08* (2009.01)

(52) U.S. Cl.
CPC ... *H04W 74/0833* (2013.01); *H04W 74/0858* (2013.01); *H04W 76/11* (2018.02); *H04W 76/12* (2018.02); *H04W 76/20* (2018.02); *H04W 76/22* (2018.02); *H04W 76/27* (2018.02); *H04W 80/02* (2013.01); *H04W 80/08* (2013.01)

(58) Field of Classification Search
CPC ..... H04W 76/20; H04W 76/22; H04W 76/27; H04W 24/10; H04W 8/26
See application file for complete search history.

(56) References Cited

U.S. PATENT DOCUMENTS

| | | |
|---|---|---|
| 2010/0272007 A1 | 10/2010 | Shen et al. |
| 2011/0032889 A1 | 2/2011 | Lee |
| 2012/0051349 A1 | 3/2012 | Teyeb |
| 2013/0070614 A1 | 3/2013 | Somasundaram et al. |
| 2013/0157700 A1 | 6/2013 | Chen et al. |
| 2013/0237267 A1 | 9/2013 | Lee |
| 2014/0086196 A1* | 3/2014 | Zhu ............... H04L 5/0053 370/329 |
| 2014/0169265 A1* | 6/2014 | Park ............... H04W 40/36 370/315 |
| 2014/0211756 A1* | 7/2014 | Bontu ............. H04W 36/026 370/331 |
| 2014/0243039 A1 | 8/2014 | Schmidt et al. |
| 2015/0029866 A1 | 1/2015 | Liao |
| 2015/0043490 A1* | 2/2015 | Wu ............... H04W 76/15 370/329 |
| 2015/0215984 A1 | 7/2015 | Schmidt et al. |
| 2015/0245403 A1* | 8/2015 | Futaki ............ H04B 7/024 370/329 |
| 2015/0264631 A1* | 9/2015 | Zhang ............ H04W 48/08 370/329 |
| 2015/0365976 A1 | 12/2015 | Lee |
| 2016/0286385 A1 | 9/2016 | Ryu |
| 2017/0019905 A1 | 1/2017 | Ko |
| 2017/0223766 A1* | 8/2017 | Lin ............... H04W 76/27 |
| 2018/0070288 A1 | 3/2018 | Kim |
| 2018/0084560 A1* | 3/2018 | Cho ............... H04W 72/1278 |
| 2018/0167915 A1 | 6/2018 | Lee |
| 2018/0176963 A1 | 6/2018 | Zeng |
| 2018/0184246 A1 | 6/2018 | Ryu |
| 2018/0220289 A1 | 8/2018 | Ryu |

FOREIGN PATENT DOCUMENTS

| | | |
|---|---|---|
| CN | 102422568 | 4/2012 |
| WO | WO 2009/038300 | 3/2009 |
| WO | WO 2010/115469 | 10/2010 |
| WO | WO 2014/047933 | 4/2014 |

OTHER PUBLICATIONS

PCT/ISA/210 Search Report issued on PCT/KR2016/009243 (pp. 3).
PCT/ISA/237 Written Opinion issued on PCT/KR2016/009243 (pp. 5).
Ericsson, "Control Plane Functions and Their Termination Points in LTE", Tdoc SRJ-060027, 3GPP RAN WG2, RAN WG3 and SA WG2 Joint Meeting, Feb. 20-21, 2006, 6 pages.
European Search Report dated Jul. 4, 2018 issued in counterpart application No. 16837369.4-1215, 9 pages.

* cited by examiner

METHOD AND APPARATUS FOR ACCESS, HANDOVER, AND ENCRYPTION CONTROL OF A UE

PRIORITY

This application is a Continuation of U.S. patent application Ser. No. 15/753,863 filed with the U.S. Patent and Trademark Office on Feb. 20, 2018, which is a National Phase Entry of PCT International Application No. PCT/KR2016/009243 which was filed on Aug. 22, 2016, and claims priority to Chinese Patent Application No. 201510514353.8, which was filed on Aug. 20, 2015, the content of each of which is incorporated herein by reference.

BACKGROUND

1. Technical Field

The present disclosure relates to radio communications, especially to a method and apparatus for access, handover, and encryption control of a user equipment (UE).

2. Background Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communication technologies more and more tend to provide users with multi-media services at high transmission rates. FIG. 1 shows a diagram of a system architecture evolution (SAE) system architecture.

In FIG. 1, a UE 101 is a terminal device for receiving data. An evolved universal terrestrial radio access network (E-UTRAN) 102 is a radio access network which includes a macro bases stations (eNodeB/NodeB) that provide an interface for the UE to access a radio network. A mobility management entity (MME) 103 is responsible for managing a mobility context, a session context and security information of the UE. A serving gateway (SGW) 104 is responsible for providing user plane functions. The MME 103 and the SGW 104 may be located in a same physical entity. A packet data network gateway (PGW) 105 is responsible for functions such as charging and lawful interception, and it may be located in a same physical entity with the SGW 104 too. A policy and charging rules function (PCRF) entity 106 is responsible for providing quality of service (QoS) policies and charging rules. A serving general packet radio service (GPRS) support node (SGSN) 108 is a network node device that provides routing for data transmissions in a universal mobile telecommunications system (UMTS). A home subscriber server (HSS) 109 is a home subscriber subsystem of the UE, and it is responsible for protecting user information such as a current location of the UE, an address of a serving node, user security information, and a packet data context of the UE.

Future LTE evolved networks should support various types of users. For example, intelligent home appliances may be a type of user, and intelligent sensing devices in on-board systems may be a type of user. Different types of users may have different requirements. Some types of users have a high requirement for transmission delay, and these types of users are called critical mechanism type communication (C-MTC) users. Some types of users do not have a high requirement for transmission delay, but require frequent establishment of data paths to transmit small data of several bits, and these types of users are called massive mechanism type communication (M-MTC) users. For these types of users, it is necessary to reduce signaling procedures needed for data establishment, and decrease load of a control plane. Anyway, different users have different requirements for the networks.

SUMMARY

At present, a LTE network architecture uses a general access network to provide services for all users, and it is not flexible enough to meet the requirements of different users, and network utilization is not maximized. However, if the network functions are implemented by software, users of different features can be more flexibly supported, resources sharing can be realized, and scheduling of the resources will be more flexible. Network functions being implemented by software refers to using software to implement functions of a current access network and a core network. In this way, even if a virtualization implementation method is not used, functions of an access network can be re-divided so that functions that are sensible to time delay and require a strong processing ability are put closer to a user.

The present disclosure provides a new network architecture which re-divides the functions of a current access network, and proposes signaling procedures of connection establishment for a UE.

An aspect of the present disclosure provides a method of a first node for communicating with a second node in a wireless communication system, with the method including transmitting, to the second node, a first message including a radio resource control (RRC) message received from a terminal and a cell radio network temporary identifier (C-RNTI) of the terminal; and receiving, from the second node, a second message to request a setup of a context for the terminal. The RRC message is transmitted to the second node without being interpreted by the first node. The first node includes a radio link control (RLC) layer, a medium access control (MAC) layer and a physical (PHY) layer. The second node includes an RRC layer and a packet data convergence protocol (PDCP) layer.

A further aspect of the present disclosure provides a first node for communicating with a second node in a wireless communication system, the first node including a transceiver and a controller coupled with the transceiver and configured to transmit, to the second node, a first message including a radio resource control (RRC) message received from a terminal and a cell radio network temporary identifier (C-RNTI) of the terminal, and receive, from the second node, a second message to request a setup of a context for the terminal. The RRC message is transmitted to the second node without being interpreted by the first node, the first node includes a radio link control (RLC) layer, a medium access control (MAC) layer and a physical (PHY) layer, and the second node includes an RRC layer and a packet data convergence protocol (PDCP) layer.

Another aspect of the present disclosure provides a method of a second node for communicating with a first node in a wireless communication system, the method including receiving, from the first node, a first message including a radio resource control (RRC) message received from a terminal and a cell radio network temporary identifier (C-RNTI) of the terminal; and transmitting, to the first node, a second message to request a setup of a context for the terminal. The RRC message is received from the first node without being interpreted by the first node, the first node includes a radio link control (RLC) layer, a medium access control (MAC) layer and a physical (PHY) layer, and the second node includes an RRC layer and a packet data convergence protocol (PDCP) layer.

A further aspect of the present disclosure provides a second node for communicating with a first node in a wireless communication system, the second node including a transceiver and a controller coupled with the transceiver and configured to receive, from the first node, a first message including a radio resource control (RRC) message received from a terminal and a cell radio network temporary identifier (C-RNTI) of the terminal, and transmit, to the first node, a second message to request a setup of a context for the terminal. The RRC message is received from the first node without being interpreted by the second node, the first node includes a radio link control (RLC) layer, a medium access control (MAC) layer and a physical (PHY) layer, and the second node includes an RRC layer and a packet data convergence protocol (PDCP) layer.

Accordingly, the present disclosure provides a new network architecture, and also provides a method about how to support a UE accessing to a network under the new network architecture. With the method of the present disclosure, users with different features can be supported flexibly, and continuously receiving data of users can be supported, which realizes network resources sharing and more flexible resources scheduling.

DETAILED DESCRIPTION

To make the objects, technical means and advantages of the present disclosure more readily understood, the present disclosure will be further elaborated hereinafter in conjunction with the accompanying drawings.

Figure 1:
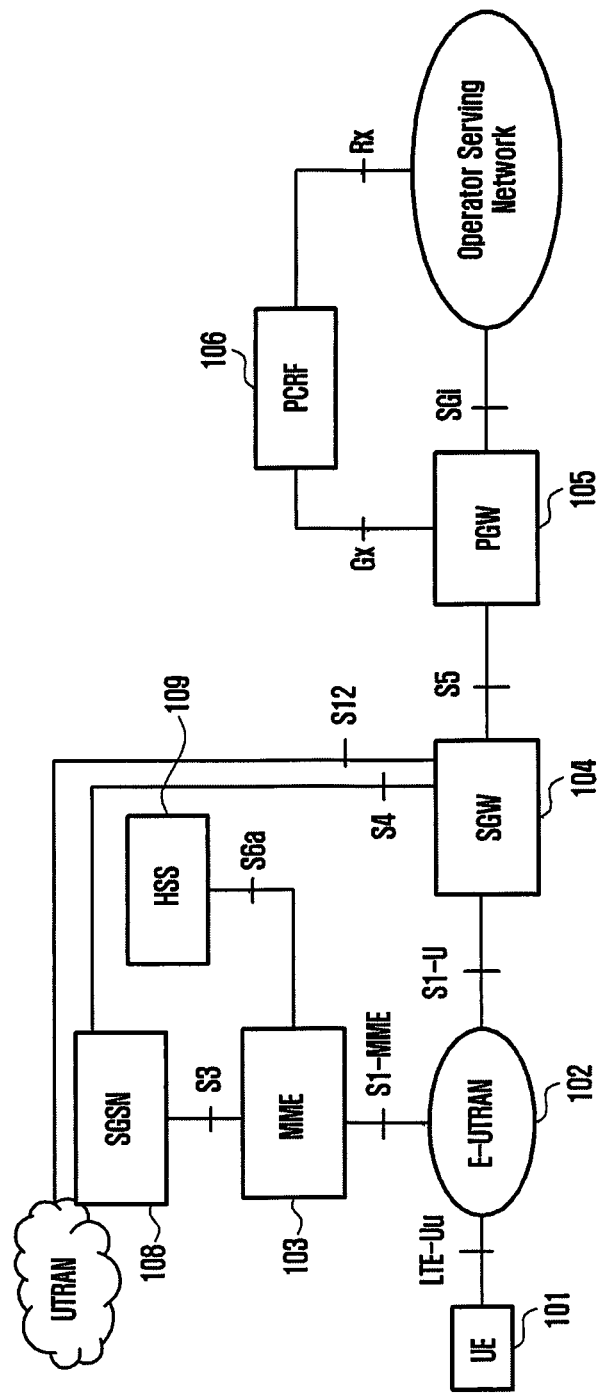
FIG. 1 is a diagram of a traditional SAE system architecture.
Figure 2:
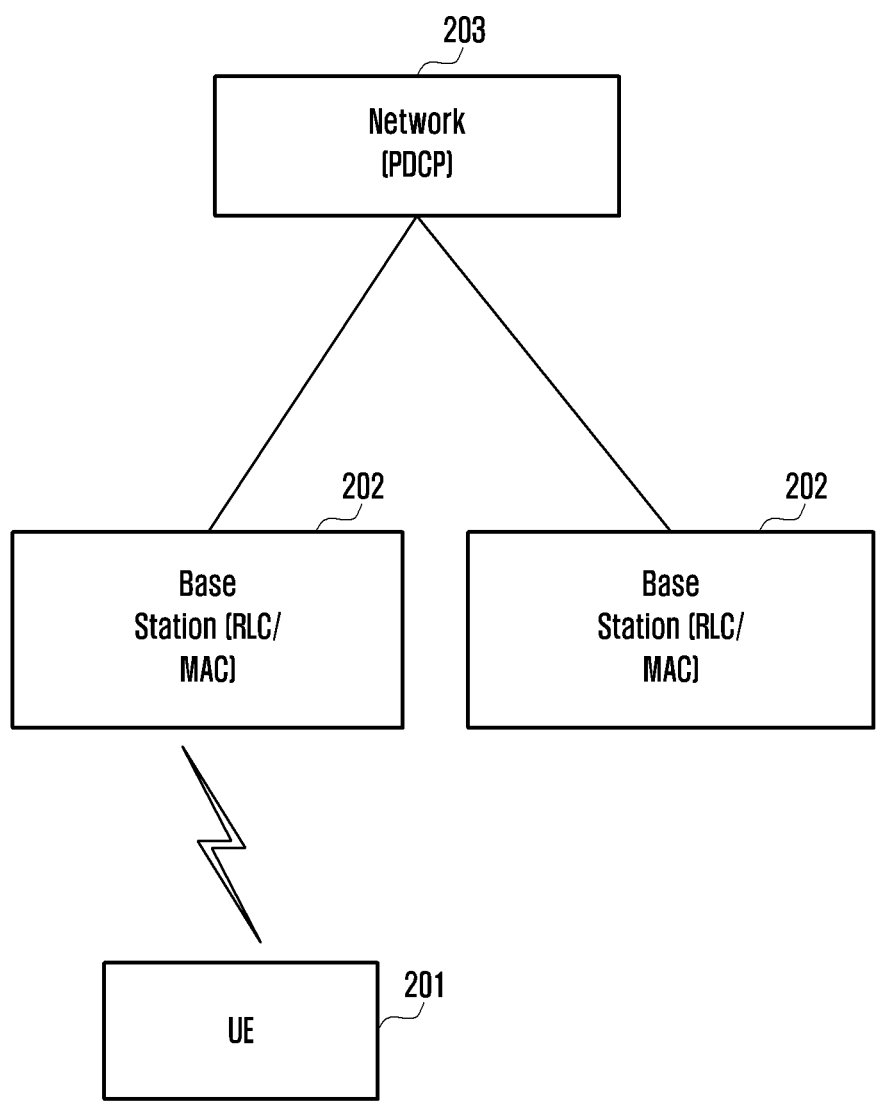
FIG. 2 is a schematic diagram of a basic structure of an access network architecture according to the present disclosure.

FIG. 2 is a diagram of a system architecture according to the present disclosure. The architecture includes: a module 201, which is a UE, and modules 202, which are base stations. The base stations carry out a radio link control (RLC) function and a media access control (MAC) function. Preferably, the base stations may be deployed at a location near the UE. The base stations may communicate with each other through interfaces, or may be controlled in a centralized way using a network node 203. In the present disclosure, it is assumed that there are no interfaces between the base stations, but the base stations are controlled in a centralized way using the network node 203.

A module 203 is a network node. The network node includes a part of functions of a traditional access network and functions of a core network, and realizes functions such as radio resource control (RRC), packet data convergence protocol (PDCP), and non-access stratum (NAS). Preferably, the network node may be realized in various ways, and the functions of the network node may be integrated in a physical entity, or may be distributed over different entities, or may be implemented using software.

The network node of the module 203 communicates with the base stations of the modules 202 through interfaces. The interfaces include a control plane and a user plane. The control plane may define a new Sx interface. An interface protocol of the control plane will be described in a control protocol shown in FIG. 4. The user plane may use tunnels, and an interface protocol of the user plane will be described in a user protocol shown in FIG. 3.

Figure 3:
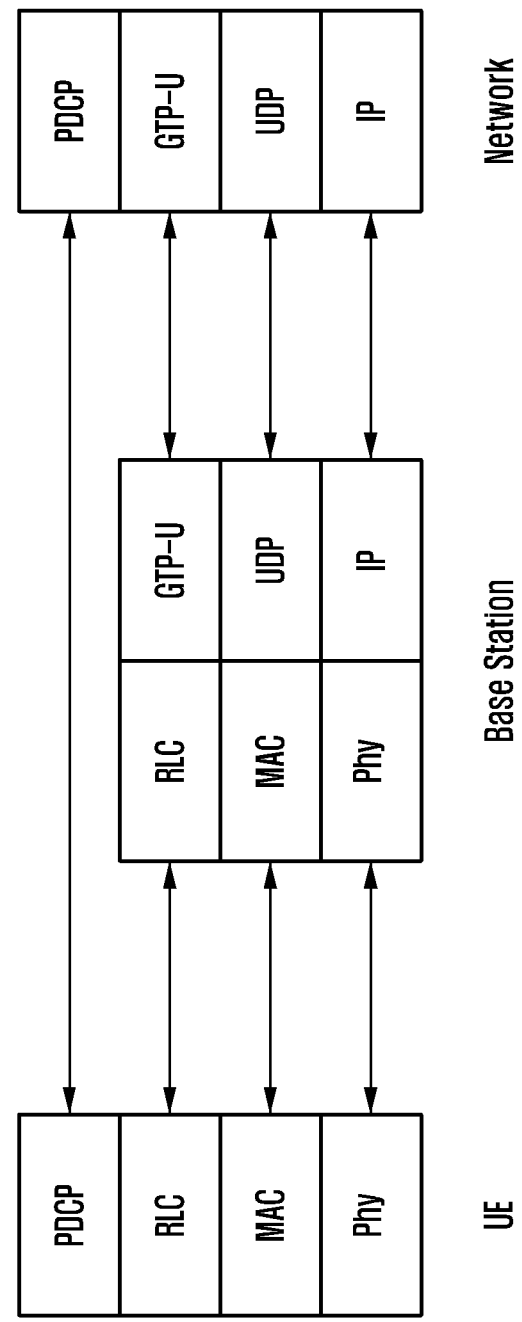
FIG. 3 is a diagram of a user plane protocol architecture according to the present disclosure.

FIG. 3 is a diagram of user plane protocols among respective entities according to the present disclosure.

A user plane between the network node entity and the base station adopts a tunnel protocol. A PDCP data packet is sent to the UE by the base station through a tunnel protocol (GPRS tunnel protocol for the user plane (GTP-U)). Tunnels and over-the-air radio bearers are one-to-one mapping. After the base station receives the data packet transmitted on a tunnel, internally, it forwards the data packet to be processed by a corresponding RLC protocol on the base station. After the data packet is processed by the RLC protocol, it is passed to be processed by a MAC protocol, and then after being processed by a physical layer protocol, it is transmitted to the UE through an air interface.

Figure 4:
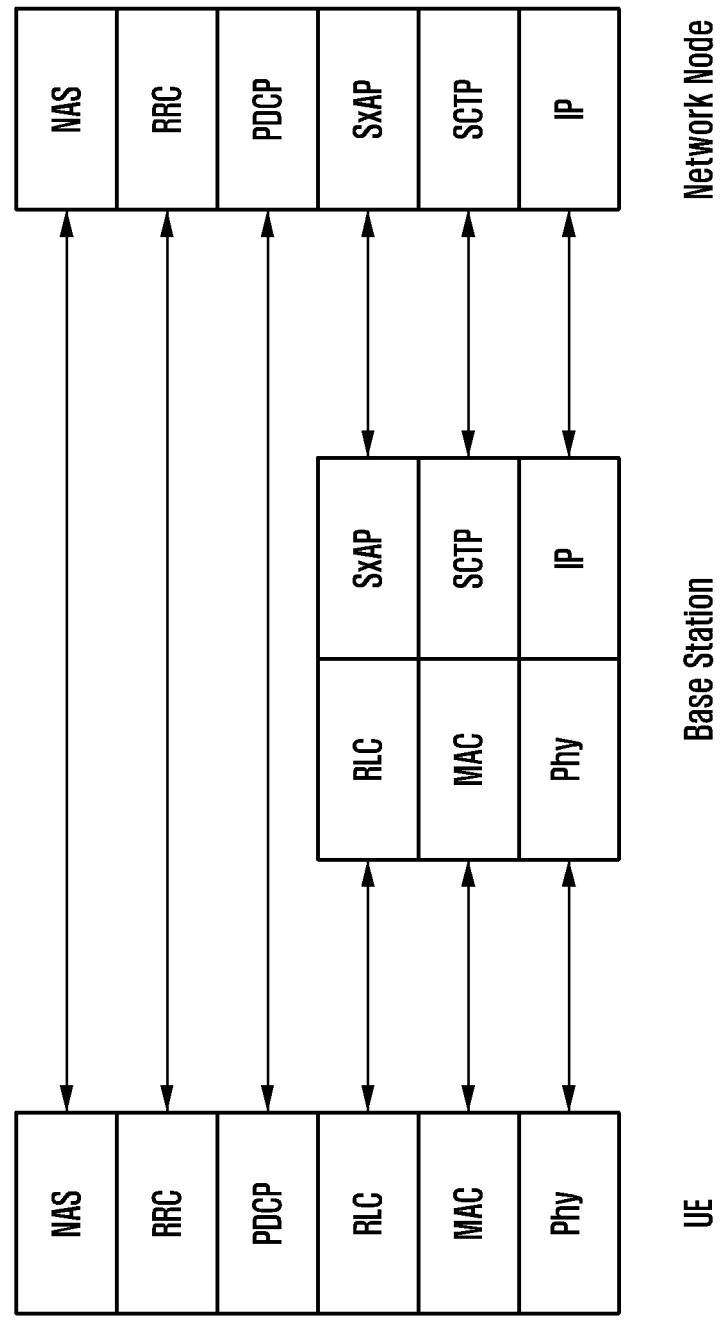
FIG. 4 is a diagram of a control plane protocol architecture according to the present disclosure.

FIG. 4 is a diagram of control plane protocols among respective entities in the present disclosure.

An Sx protocol is defined for an interface Sx between the base station and the network node, and transmissions of downlink messages are sent to the base station by the network node. A NAS protocol packet on the network node is transmitted to a RRC protocol layer through an inner interface. The RRC protocol layer generates a RRC message, and the NAS data packet is carried in a transparent container in the RRC message. The RRC protocol layer may generate a RRC message directly, not including NAS information. The RRC message is processed by PDCP, and it is then transmitted to the base station through the Sx protocol. A RRC data packet is transmitted to the base station by being contained in a transparent container by the network node. The Sx protocol also carries configuration information made by the network node for the base station. After the RRC message is received by the base station by means of the Sx protocol, it is forwarded to be processed by means of a corresponding RLC protocol through an inner interface, and then after being processed by a MAC protocol and a physical layer protocol, it is forwarded to the UE by the base station. Uplink data transmission procedures are similar.

Figure 5:
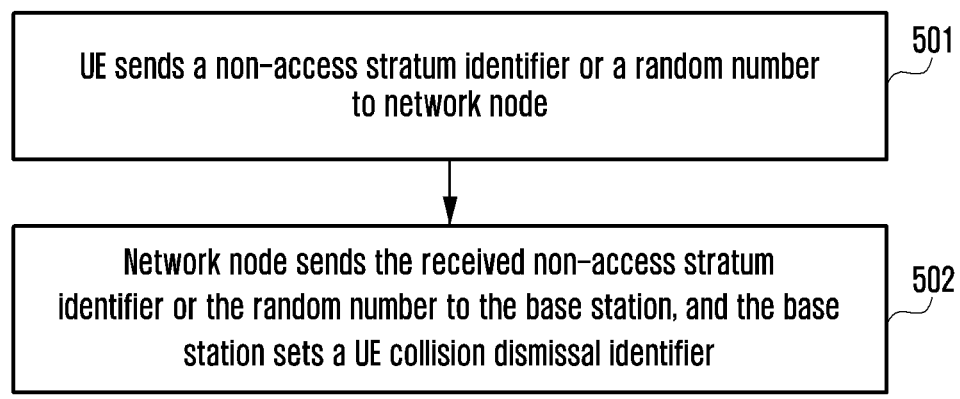
FIG. 5 is a schematic diagram of a basic flow of a UE access method according to the present disclosure.

FIG. 5 is a schematic diagram of a basic flow of a UE access method according to the present disclosure. The flow includes processing at the UE, the base station, and the network node. For description purpose, the method is described by way of three devices interacting with each other. As shown in FIG. 5, the method includes the following steps.

At step 501, the UE sends a non-access stratum identifier or a random number to the network node.

The RRC protocol terminates at the UE and the network node. A RRC message sent by the UE contains the non-access stratum identifier, and the network node can parse out the non-access stratum identifier using RRC. If the UE stores a non-access stratum identifier previously allocated by the network node, e.g., an S-TMSI, then the UE sets the non-access stratum identifier to the S-TMSI, and if the UE has not stored a non-access stratum identifier allocated by the network node, then the UE generates a random number, and sends the random number to the network node.

At step 502, the network node sends the non-access stratum identifier or random number of the UE received to the base station, and the base station sets a UE collision dismissal identifier.

The RRC message in step 501 is the first RRC message sent by the UE, and it is sent to the network node by the base station through an Sx interface. Therefore, the base station should be able to establish a relation between the Sx interface and a UE context on the base station. After the base station receives the RRC message sent from the UE in step 501, based on a logic channel carried in the RRC message, the base station can know that this is the first RRC message. Generally, the base station assigns a unique identifier for the UE, e.g., a cell radio network temporary identifier (C-RNTI), within the base station, and sends it to the UE before the step 501, i.e., during a random access procedure. In the step 501, the base station can receive the C-RNTI of the UE, and the C-RNTI is included in a MAC header. The base station sends the RRC message to the network node through an Sx interface message, and the base station allocates an Sx interface-based identifier for the UE, e.g., an eNBUESxAP ID, to uniquely identify the UE on the interface between the base station and the network node. When the network node sends a corresponding message, it also allocates an Sx interface-based identifier for the UE, e.g., a NetworkUESxAP ID. Through the pair of identifiers, a UE signaling link is established on the Sx interface. After the UE signaling link is established, signaling related to the UE carries the pair of identifiers. In this way, the base station saves a mapping relationship between the pair of Sx interface-based identifiers of the UE and the C-RNTI. After the base station receives an Sx interface message, through a pair of identifiers of the UE carried in the message, the base station can send the message to a correct UE.

After the RRC layer of the network node receives the message sent in step 501, if the message is a first message for RRC establishment i.e., a RRC request message, the network node sends a non-access stratum identifier or a random number carried by the message to the base station. A purpose of sending the message to the base station is to let the base station send the non-access stratum identifier to the UE for random access collision detection and dismissal. After the base station receives the non-access stratum identifier or the random number, the base station uses the non-access stratum identifier or the random number to dismiss collisions, i.e., containing related information in a MAC header and sending it to the UE. In the MAC header, the non-access stratum identifier is referred to as a UE collision dismissal identifier. Meanwhile, the base station contains a RRC establishment message in a MAC data portion, and sends it to the UE. After UE receives the RRC establishment message, the UE first compares the UE collision dismissal identifier contained in the MAC header and a non-access stratum identifier (or a random number) of it. If they are same, then the UE knows that it has passed collision detection and can parse the RRC message. If they are different, then the UE knows that it has not passed collision detection, and may carry out a next random access procedure.

The base station receives the UE collision dismissal identifier from the Sx interface, and internally forwards it to the MAC layer of the base station, and the base station indicates the UE collision dismissal identifier in a MAC control packet.

Figure 6:
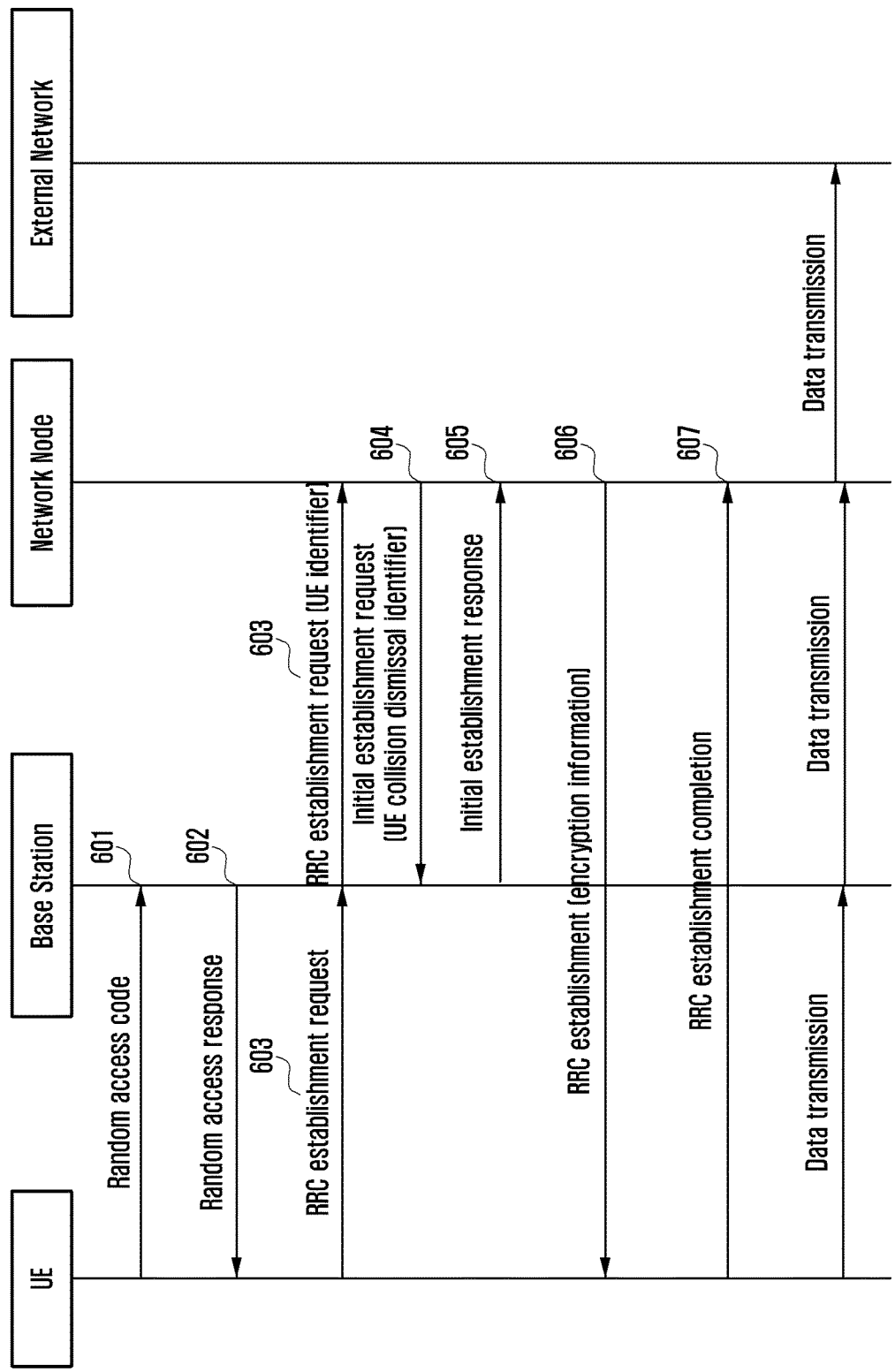
FIG. 6 is a schematic diagram of the UE access method according to Embodiment 1 of the present disclosure.

FIG. 6 is a method for a UE accessing a network according to an embodiment. Under the architecture shown in FIG. 2, the UE actively initiates a RRC establishment procedure. This procedure may be used in other network architectures. The method for the UE accessing the network may include the following steps.

At step 601, the UE sends a random access code to the base station.

The UE may select one of two sets of random access codes. Which set being selected decides the length of the third message in step 603, and is dependent on the air interface quality of the UE. The sets of random access codes and corresponding thresholds are broadcast to the UE through a broadcast message.

At step 602, the MAC layer of the base station sends a radio access response message to the UE. The radio access response message is sent on a downlink shared channel.

The radio access response message includes a random access code indication, time adjustment information, initial uplink resource allocation and a unique temporary cell identifier, C-RNTI. The radio access response message is generated by the MAC layer, and foregoing information is included within a MAC layer frame. The MAC layer frame includes a MAC header and a MAC data packet, or only includes a MAC header. The MAC header contains control information, e.g., foregoing information being contained in the MAC header.

At step 603, the UE sends an uplink RRC establishment request message.

The uplink RRC establishment request message is sent on an uplink shared channel, and the uplink shared channel is allocated by the base station in step 602. The RRC establishment request message is sent to the base station by being contained in the MAC data packet portion. The RRC establishment request message includes a non-access stratum identifier of the UE, e.g., an S-TMSI. If no non-access stratum identifier is allocated to the UE, the UE generates a random number, and contains the random number in the RRC establishment request message.

After the MAC layer of the base station receives a MAC protocol data unit (MAC PDU), the base station finds that a logic channel indicated by the MAC header is a common control channel (CCCH), and then the MAC layer of the base station knows that the MAC PDU bears a RRC message. The base station does not parse the data packet contained in the MAC PDU, but sends the MAC data packet contained in the received MAC PDU to the SxAP protocol through an inner interface (may be through RLC), to trigger the SxAP to forward the RRC request message to the network node. The message of the inner interface may carry a unique cell identifier of the UE, C-RNTI, which may be a temporary C-RNTI. The MAC layer of the base station knows the C-RNTI or temporary C-RNTI of the UE, and when the base station allocates a resource to the UE, it will use the C-RNTI to indicate the resource is allocated to which UE. The SxAP saves a mapping relation between C-RNTIs and Sx interface-based UE identifiers allocated by the base station. In this way, the SxAP knows which UE sends the RRC message through the Sx interface.

The SxAP protocol layer of the base station sends the first Sx interface-based message to the SxAP protocol layer of the network node. The RRC request message may be sent through this first SxAP message. For example, the initial UE message is an Sx interface-based message, and the initial UE message includes a RRC container which contains the RRC establishment request message sent by the UE.

The first SxAP message further carries an Sx interface-based UE identifier allocated by the base station to uniquely identify the UE on the Sx interface. Similarly, the network node also allocates an Sx interface-based UE identifier for the UE in a response message, and the pair of identifiers is carried in signaling of the UE on the SxAP. Through the pair of identifiers, the base station and the network node can find a context of a corresponding UE.

After the network node receives the first uplink message of the Sx interface, it forwards the RRC container contained in the first uplink message through the SxAP protocol to be processed by the RRC protocol of the network node. The RRC protocol performs collision detection of radio random access, and by checking the non-access stratum identifier of the UE or the random number contained in the RRC establishment request message, the network node can identify a UE of radio random access. Then, the RRC protocol generates a RRC establishment message, and the RRC establishment message is sent to be processed by the SxAP protocol through an inner interface, and the message in step 604 is launched through the SxAP protocol.

At step 604, the network node sends an initial establishment request message.

The initial establishment request message may have other names. The initial establishment request message carries a UE collision dismissal identifier, and the UE collision dismissal identifier is set to be the non-access stratum identifier of the UE or the random number carried in the message of the step 603. The UE collision dismissal identifier is sent to the MAC layer through an inner interface for use by the MAC layer in subsequent steps.

The initial establishment request message further includes an Sx interface-based UE identifier allocated to the UE by the network node, and the Sx interface-based UE identifier uniquely identifies the UE on the Sx interface or on the network node.

The initial establishment request message may further include configuration information for the RLC and MAC layers, for example, including a radio bearer (RB) identifier and configuration of a signaling radio bearer. The initial establishment request message may further include a RB identifier of a data radio bearer and uplink receiving tunnel information of the data bearer on the Sx interface. Tunnel information includes an IP address and a tunnel number.

The SxAP of the base station receives the initial establishment request message of the step 604, and sends a C-RNTI and a UE collision dismissal identifier to the MAC layer.

At step 605, the base station sends an initial establishment response message.

The initial establishment response message includes a RB identifier of a successfully configured radio bearer and downlink receiving tunnel information of the data bearer on the Sx interface, including an IP address and a tunnel number.

At step 606, the network node sends a RRC establishment message to the UE.

The RRC establishment message is generated based on the RRC protocol of the network node (as described in the step 603), and is sent to the base station through an Sx interface message, e.g., a downlink data transmission message. The downlink data transmission message includes a UE identifier on the Sx interface and a RRC container. The RRC container includes the RRC establishment message.

The RRC establishment message includes elements of an original RRC establishment message, i.e., including configuration information on radio bearer of the UE, e.g., including a RB identifier and configuration information of signaling radio bearer, and a RB identifier and configuration information of data radio bearer. The RRC establishment message may further include encrypted information, and may specifically include encryption algorithm configuration and integrity protection algorithm configuration.

At step 607, the UE sends a RRC establishment completion message to the network node.

The RRC establishment completion message includes an identifier of a successfully established bearer.

After the base station receives the MAC PDU, through logic channel information contained in the MAC header, the base station can find a corresponding RLC, and then it forwards the data packet of the MAC PDU through the RLC for processing by the Sx protocol, and transmits the RRC message through an Sx interface message to the network node. The RRC establishment completion message further includes a non-access stratum message, and based on the non-access stratum message, the network can establish a data link with an external network.

Afterwards, data transmissions can be carried out between the UE and the network. This procedure omits operations in the network, and it is assumed that the operations over the network layer are the same with an existing procedure.

Figure 7:
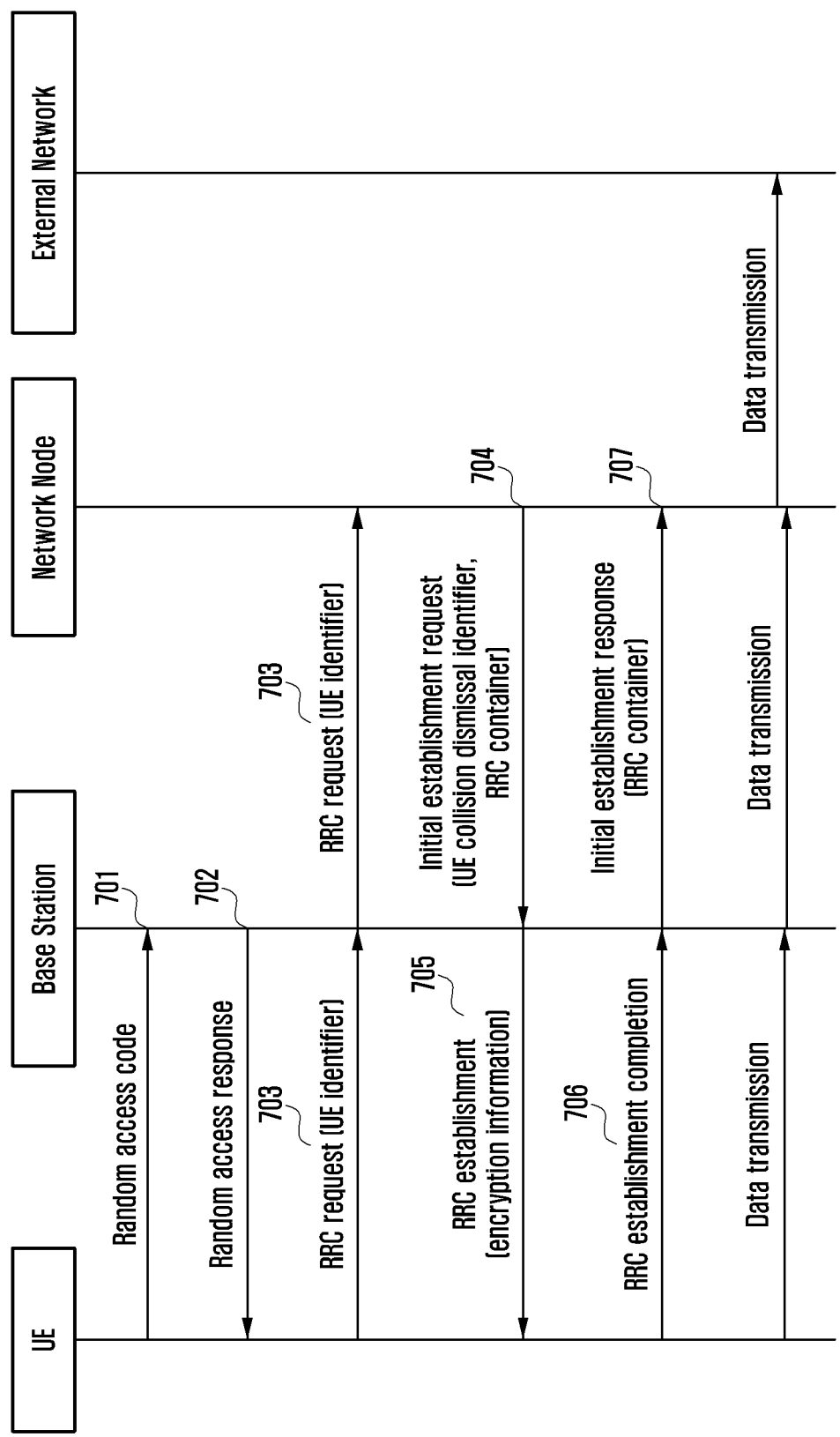
FIG. 7 is a schematic diagram of the UE access method according to Embodiment 2 of the present disclosure.

FIG. 7 is a schematic diagram of a flow of a method for a UE accessing a network according to Embodiment 2 of the present disclosure. Under the architecture shown in FIG. 2, the UE actively initiates a RRC establishment procedure. This procedure may be used in other network architectures. The method for the UE accessing the network includes the following steps.

At step 701, the UE sends a random access code to a base station.

The UE may select one of two sets of random access codes. Which set being selected decides the length of the third message in step 703, and is dependent on the air interface quality of the UE. The sets of random access codes and corresponding thresholds are broadcast to the UE through a broadcast message.

At step 702, the MAC layer of the base station sends a radio access response message to the UE. The radio access response message is sent on a downlink shared channel.

The radio access response message includes a random access code indication, time adjustment information, initial uplink resource allocation and a unique temporary cell identifier, C-RNTI. The radio access response message is generated by the MAC layer, and foregoing information is included within a MAC layer frame. The MAC layer frame includes a MAC header and a MAC data packet.

At step 703, the UE sends an uplink RRC establishment request message.

The uplink RRC establishment request message is sent on an uplink shared channel, and the uplink shared channel is allocated by the base station in step 702. The RRC establishment request message is sent to the base station by being contained in the MAC data packet portion. The RRC establishment request message includes a non-access stratum identifier of the UE, e.g., an S-TMSI. If no non-access stratum identifier is allocated to the UE, the UE generates a random number, and contains the random number in the RRC establishment request message.

After the MAC layer of the base station receives a MAC protocol data unit (MAC PDU), the base station finds that a logic channel indicated by the MAC header is a common control channel (CCCH), and then the MAC layer of the base station knows that the MAC PDU bears a RRC message. The base station does not parse the data packet contained in the MAC PDU, but sends the MAC data packet contained in the received MAC PDU to the SxAP protocol through an inner interface (may be through RLC), to trigger the SxAP to forward the RRC request message to the network node. The message of the inner interface may carry a unique cell identifier of the UE, C-RNTI, which may be a temporary C-RNTI. The MAC layer of the base station knows the C-RNTI or temporary C-RNTI of the UE, and when the base station allocates a resource to the UE, it will use the C-RNTI to indicate the resource is allocated to which UE. The SxAP saves a mapping relation between C-RNTIs and Sx interface-based UE identifiers allocated by the base station. In this way, the SxAP knows which UE sends the RRC message through the Sx interface.

The SxAP protocol layer of the base station sends the first Sx interface-based message to the SxAP protocol layer of the network node. The RRC request message may be sent through this first SxAP message. For example, the initial UE message is an Sx interface-based message, and the initial UE message includes a RRC container which contains the RRC establishment request message sent by the UE.

The first SxAP message further carries an Sx interface-based UE identifier allocated by the base station to uniquely identify the UE on the Sx interface. Similarly, the network node also allocates an Sx interface-based UE identifier for the UE in a response message, and the pair of identifiers is carried in signaling of the UE on the SxAP. Through the pair of identifiers, the base station and the network node can find a context of a corresponding UE.

After the network node receives the first uplink message of the Sx interface, it forwards the RRC container contained in the first uplink message through the SxAP protocol to be processed by the RRC protocol of the network node. The RRC protocol performs collision detection of radio random access, and by checking the non-access stratum identifier of the UE or the random number contained in the RRC establishment request message, the network node can identify a UE of radio random access. Then, the RRC protocol generates a RRC establishment message, and the RRC establishment message is sent to be processed by the SxAP protocol through an inner interface, and the message in step 704 is launched through the SxAP protocol.

At step 704, the network node sends an initial establishment request message.

The initial establishment request message may have other names. The initial establishment request message carries a UE collision dismissal identifier, and the UE collision dismissal identifier is set to be the non-access stratum identifier of the UE or the random number carried in the message of the step 703.

The initial establishment request message further includes an Sx interface-based UE identifier allocated to the UE by the network node, and the Sx interface-based UE identifier uniquely identifies the UE on the Sx interface or on the network node.

The initial establishment request message may further include configuration information for the RLC and MAC layers, for example, including a radio bearer (RB) identifier and configuration of a signaling radio bearer. The initial establishment request message may further include a RB identifier of a data radio bearer and uplink receiving tunnel information of the data bearer on the Sx interface. Tunnel information includes an IP address and a tunnel number.

The initial establishment request message includes a RRC container, and the RRC contain contains the RRC establishment message. The RRC establishment message includes elements of an original RRC establishment message, i.e., including configuration information for a radio bearer of the UE, e.g., including a RB identifier and configuration information of a signaling radio bearer, and a RB identifier and configuration information of a data radio bearer. The initial establishment request message may further include encryption information, and may specifically include encryption algorithm configuration and integrity protection algorithm configuration.

At step 705, the base station forwards the RRC establishment message to the UE.

After the base station receives the message in step 704 through the Sx protocol, the Sx interface sends the RRC container and the UE collision dismissal identifier to the MAC protocol (through RLC). After the RRC container is processed by RLC, and handed to the MAC layer, it is called MAC service data unit (SDU). On the MAC layer, the received SDU is put into a MAC data packet portion, and the MAC data packet portion includes the UE collision dismissal identifier. Then the base station sends the MAC PDU to the UE.

At step 706, the UE sends a RRC establishment completion message to the base station.

After the MAC layer of the base station receives the MAC PDU, it can find a corresponding RLC through logic channel information contained in a MAC header, and then it forwards the data packet of the MAC PDU through RLC to be processed through the Sx protocol. For control logic information, the base station knows that what is contained in the data packet of the MAC PDU is RRC signaling, and then the base station sends the RRC message through an Sx interface message to the network node.

At step 707, the base station sends an initial establishment response message to the network node.

The initial establishment response message carries a RRC container, and the RRC container carries a RRC establishment completion message. The RRC establishment completion message may further include a non-access stratum message. Based on the non-access stratum message, the network can establish a data link with the external network.

Afterwards, data transmissions can be carried out between the UE and the network. The procedures simplify operations over the network, and it is assumed that the operations over the network are the same with existing procedures.

Figure 8:
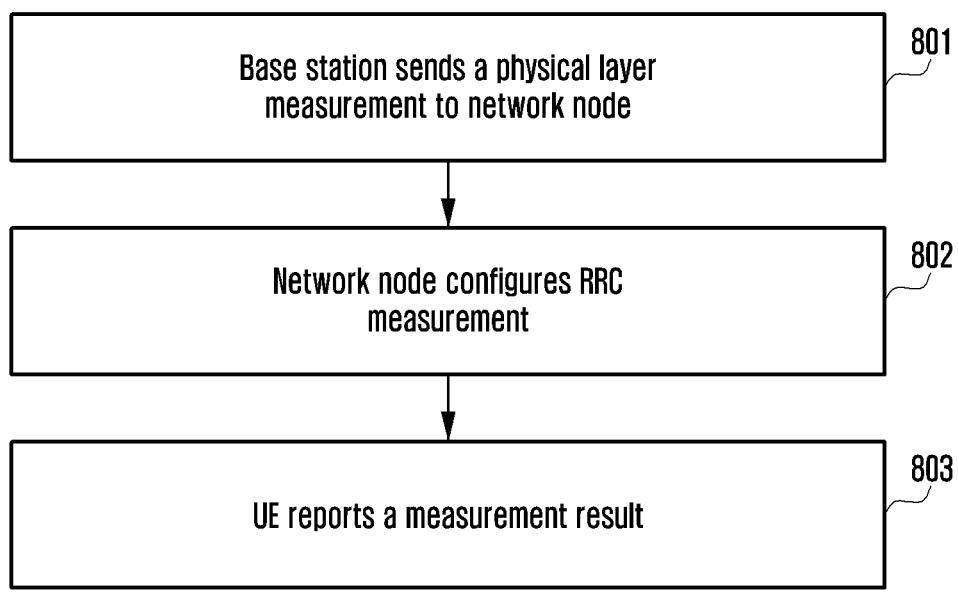
FIG. 8 is a schematic diagram of a flow of a UE handover method according to the present disclosure.

FIG. 8 is a schematic diagram of a basic flow of a UE handover method according to the present disclosure. The flow optimizes a data plane between the base stations and the network.

According to the architecture shown in FIG. 2, PDCP and RRC are on the network node, and RLC and MAC are on the base stations. The base stations and the network node need to adopt a traffic control mechanism to reasonably allocate data. For example, when there are two base stations used to provide data transmissions for the UE, PDCP needs to know which base station has a better data transmission state so as to allocate more data for the base station, and thus, the base stations need to report their traffic information. At present, traffic information reported by a base station includes buffer size, the amount of data lost on an interface, and the largest PDCP number successfully transmitted to the UE. In the architecture shown in FIG. 2, a current traffic control mechanism will be used, but it needs to be enhanced and optimized.

Since the network needs to configure measurement of the UE, and the network needs to know the physical layer channel quality of the UE. On the physical layer, the UE needs to report its current channel state, e.g., channel state information (CSI), and sounding reference signal (SRS). CSI includes various kinds of report information in which a channel quality indicator (CQI) reflects a channel quality. If the network knows a channel quality of the UE, the network can determine how to configure measurement of the RRC layer of the UE, and thus the method in FIG. 7 needs to be used.

At step 801, the base station sends a physical layer measurement to the network node.

The base station receives a physical layer measurement report from the UE, and the physical layer measurement report sent by the UE includes CSI and SRS. The base station can send some physical layer report information sent from the UE to the network node through a control plane or user plane. For example, when the base station reports traffic information, it also contains CSI which at least includes CQI information in the traffic information report. The period of report is the same with the traffic information report mechanism.

Or, on the control plane, a new message may be defined, and through this newly defined message, the base station can send CSI information (at least includes CQI information) to the network node through the Sx interface.

After the network node receives physical layer report information sent by the base station, with reference to physical layer report information, the RRC protocol of the network node can carry out configuration of measurement control.

At step 802, the network node configures RRC measurement.

RRC configures the UE to measure a neighboring cell and a neighboring frequency.

At step 803, the UE reports a measurement result.

After the network node receives the RRC measurement result, it makes a handover decision based on the received measurement result. Specifically, the RRC protocol of the network node can determine whether it needs to switch a master serving cell and a master serving base station of the UE to another cell or another base station. If the network node needs, the network node initiates a switch procedure subsequently.

Figure 9:
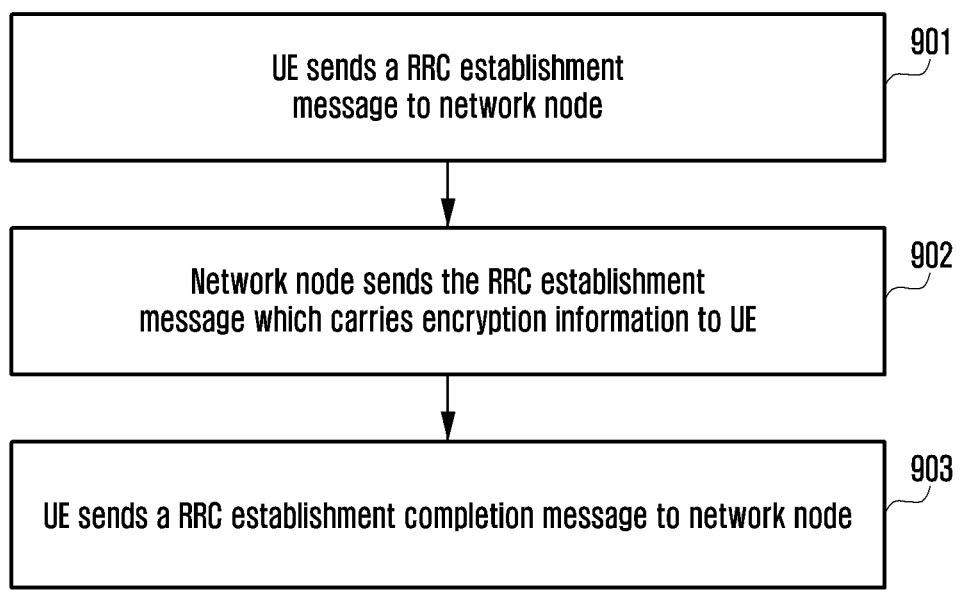
FIG. 9 is a schematic diagram of a flow of a UE encryption control method according to the present disclosure.

According to the architecture of the present disclosure, or in other network architectures, the RRC and control encryption functions are located in a same entity, which can reduce signaling flows of the UE accessing the network. During RRC establishment, encryption information is sent to the UE. FIG. 9 is a schematic diagram of the method.

At step 901, the UE sends an uplink RRC establishment request message to the network node.

The uplink RRC establishment request message is sent on an uplink shared channel, and the uplink shared channel is allocated by the base station in step 702. The RRC establishment request message is sent to the base station by being contained in the MAC data packet portion. The RRC establishment request message includes a non-access stratum identifier of the UE, e.g., an S-TMSI. If no non-access stratum identifier is allocated to the UE, the UE generates a random number, and contains the random number in the RRC establishment request message.

At step 902, the network node sends a RRC establishment message to the UE.

The RRC establishment message includes elements of an original RRC establishment message, i.e., including configuration information on radio bearer of the UE, e.g., including a RB identifier and configuration information of signaling radio bearer, and a RB identifier and configuration information of data radio bearer. The RRC establishment message may further include encrypted information, and may specifically include encryption algorithm configuration and integrity protection algorithm configuration.

At step 903, the UE sends a RRC establishment completion message to the network node.

The UE performs configuration according to the message in the step 902, and then sends the RRC establishment completion message to the network node. Afterwards, the UE can send and receive data.

What is described in the foregoing is detailed implementation of UE access, handover, and encryption control methods. The present disclosure further provides a network node and a base station applicable to implement the foregoing methods.

Corresponding to the UE accessing method, the present disclosure further provides a network node and a base station.

The network node corresponding to the UE accessing method includes a receiving unit, a sending unit, a PDCP layer processing unit, a RRC layer processing unit, and a NAS layer processing unit.

The receiving unit is configured to receive a non-access stratum identifier of a UE through a RRC message sent from the UE in the communication system. The sending unit is configured to send the non-access stratum identifier of the UE or the random number received by the receiving unit to the base station, for the base station to set a UE collision dismissal identifier. The PDCP layer processing unit, the RRC layer processing unit and the NAS layer processing unit are respectively used for PDCP, RRC and NAS layers processing of sending and receiving packets.

The base station corresponding to the UE accessing method includes a transparent transmission unit, a sending unit, a receiving unit, a RLC layer processing unit, and a MAC layer processing unit.

The transparent transmission unit is configured to transparently transmit the RRC message which contains the non-access stratum identifier of the UE or the random number generated by the UE sent from the UE to the network node in the communication system. The receiving unit is configured to receive the non-access stratum identifier of the UE or the random number sent from the network node, and set a UE collision dismissal identifier to the non-access stratum identifier of the UE or the random number. The RLC layer processing unit and the MAC layer processing unit are respectively configured for RLC and MAC layers processing of packets sent or received. The Sx interface is an interface between the base station and the network node; and a pair of UE identifiers includes an Sx interface-based UE identifier allocated by the identifier allocation unit and an Sx interface-based UE identifier allocated by the network device, and is used to establish a singling link for the UE on the Sx interface and uniquely identify signaling related to the UE.

Corresponding to the UE handover method, the present disclosure provides a network node which includes a receiving unit, a configuration unit, a handover decision unit, a PDCP layer processing unit, a RRC layer processing unit, and a NAS layer processing unit.

The receiving unit is configured to receive the physical layer measurement result sent from the base station in the communication system and received from the UE in the communication system by the base station; and is further configured to receive the RRC measurement report reported by the UE. The configuration unit is configured to send a RRC measurement configuration to the UE based on the physical layer measurement report. The handover decision unit is configured to carry out a handover decision for the UE according to the RRC measurement report reported by the UE. The PDCP layer processing unit, the RRC layer processing unit, and the NAS layer processing unit are respectively configured for PDCP, RRC, and NAS layer processing of sending and receiving packets.

Corresponding to the UE encryption control method, the present disclosure provides a network node which includes a receiving unit and a sending unit.

The receiving unit is configured to receive an uplink RRC establishment request message sent from the UE in the communication system. The sending unit is configured to send a RRC establishment message to the UE, and contain encryption information in the RRC establishment message.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

What is claimed:

1. A method performed by first node in a communication system, the method comprising:
    transmitting, to a second node, a first message including a radio resource control (RRC) message received from a terminal and an identifier allocated to the terminal by the first node to identify the terminal over an interface between the first node and the second node; and
    receiving, from the second node, a second message including an identifier allocated to the terminal by the second node to identify the terminal over the interface, an identifier of a data radio bearer, an internet protocol (IP) address of an uplink tunnel associated with the data radio bearer, and an identifier of the uplink tunnel,
    wherein the first node includes a radio link control (RLC) layer, a medium access control (MAC) layer and a physical (PHY) layer, and
    wherein the second node includes an RRC layer and a packet data convergence protocol (PDCP) layer.

2. The method of claim 1, further comprising transmitting, to the second node, a third message including information associated with the physical layer.

3. The method of claim 1, wherein the first message further includes a cell radio network temporary identifier (C-RNTI) of the terminal.

4. The method of claim 1, wherein the RRC message is received from the second node without being interpreted by the first node.

5. A first node comprising:
    a transceiver; and
    a processor configured to:
        transmit, to a second node via the transceiver, a first message including a radio resource control (RRC) message received from a terminal and an identifier allocated to the terminal by the first node to identify the terminal over an interface between the first node and the second node, and
        receive, from the second node via the transceiver, a second message including an identifier allocated to the terminal by the second node to identify the terminal over the interface, an identifier of a data radio bearer, an internet protocol (IP) address of an uplink tunnel associated with the data radio bearer, and an identifier of the uplink tunnel,
    wherein the first node includes a radio link control (RLC) layer, a medium access control (MAC) layer and a physical (PHY) layer, and
    wherein the second node includes an RRC layer and a packet data convergence protocol (PDCP) layer.

6. The first node of claim 5, wherein the processor is further configured to transmit, to the second node, a third message including information associated with the physical layer.

7. The first node of claim 5, wherein the first message further includes a cell radio network temporary identifier (C-RNTI) of the terminal.

8. The first node of claim 5, wherein the RRC message is received from the second node without being interpreted by the first node.

9. A method performed by a second node in a communication system, the method comprising:
receiving, from a first node, a first message including a radio resource control (RRC) message received from a terminal and an identifier allocated to the terminal by the first node to identify the terminal over an interface between the first node and the second node; and
transmitting, to the first node, a second message including an identifier allocated to the terminal by the second node to identify the terminal over the interface, an identifier of a data radio bearer, an internet protocol (IP) address of an uplink tunnel associated with the data radio bearer, and an identifier of the uplink tunnel,
wherein the first node includes a radio link control (RLC) layer, a medium access control (MAC) layer and a physical (PHY) layer, and
wherein the second node includes an RRC layer and a packet data convergence protocol (PDCP) layer.

10. The method of claim 9, wherein the method further comprises receiving, from the first node, a third message including information associated with the physical layer.

11. The method of claim 9, wherein the first message further includes a cell radio network temporary identifier (C-RNTI) of the terminal.

12. The method of claim 9, wherein the RRC message is transmitted to the second node without being interpreted by the first node.

13. A second node comprising:
a transceiver; and
a processor configured to:
receive, from a first node via the transceiver, a first message including a radio resource control (RRC) message received from a terminal and an identifier allocated to the terminal by the first node to identify the terminal over an interface between the first node and the second node, and
transmit, to the first node via the transceiver, a second message including an identifier allocated to the terminal by the second node to identify the terminal over the interface, an identifier of a data radio bearer, an internet protocol (IP) address of an uplink tunnel associated with the data radio bearer, and an identifier of the uplink tunnel,
wherein the first node includes a radio link control (RLC) layer, a medium access control (MAC) layer and a physical (PHY) layer, and
wherein the second node includes an RRC layer and a packet data convergence protocol (PDCP) layer.

14. The second node of claim 13, wherein the processor is further configured to receive, from the first node, a third message including information associated with a physical layer.

15. The second node of claim 13, wherein the first message further includes a cell radio network temporary identifier (C-RNTI) of the terminal.

16. The second of claim 13, wherein the RRC message is transmitted to the second node without being interpreted by the first node.

* * * * *